UNITED STATES PATENT OFFICE 2,670,375

PREPARATION OF AN ISOMER OF AMIDONE

Roger W. Stoughton, St. Louis, Mo., assignor to Mallinckrodt Chemical Works, St. Louis, Mo., a corporation of Missouri No Drawing. Application May 10, 1947, Serial No. 747,331

3 Claims. (Cl. 260—570)

This invention relates to therapeutic compositions and more particularly to a therapeutic composition which is an improvement over amidone.

Among the objects of this invention are the provision of a therapeutic composition which has the effectiveness of amidone; the provision of a therapeutic composition of the type referred to which is less toxic than amidone; the provision of a composition which is an effective analgesic and which may be utilized in the preparation of useful analgesic compositions; the provision of a composition of the type indicated which may be easily prepared from available materials; and the provision of an effective method for preparing the composition referred to. Other objects will be in part apparent and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

The composition commonly referred to as amidone, and believed to be 6-dimethylamino-4,4-diphenyl-3-heptanone, has been found to have valuable analgesic properties and constitutes a useful component for analgesic compositions. It has, however, a definite toxic effect when utilized in large therapeutic doses, so that its usefulness to attain an analgesic effect is at times limited.

The present invention provides an analgesic compound which has substantially the analgesic effectiveness of amidone, but is less toxic than amidone. The compound of the present invention may be utilized, as amidone is, to formulate analgesic compositions, but because of its lower toxicity a wider range of safer, useful compositions is possible.

The analgesic compound of the present invention may be obtained by reacting a dimethylaminopropyl-diphenylacetonitrile, believed to be gamma-dimethylamino-alpha,alpha-diphenyl-beta-methylbutyronitrile, with an ethyl Grignard reagent to form a condensation product which on hydrolysis yields the analgesic compound. The Grignard reaction should be carried out at a temperature not substantially below 70° C. and preferably approximately at 90° C. In order to obtain the desired temperature at atmospheric pressure, a higher boiling solvent may be used, or, if the Grignard reagent is prepared in ether, it may be preferable to distill off part of the ether and replace it with a higher boiling non-reactive solvent. The compound, which is an organic base, forms salts with acids. It may therefore be isolated as a salt and purified. The base or its salts may be used in analgesic preparations.

One of the intermediates for the preparation of amidone is made by the reaction of diphenylacetonitrile with a dimethylaminochloropropane prepared from 1-dimethylamino-2-propanol. Probably by rearrangement of the dimethylaminopropyl group, the reaction forms a mixture of isomeric amino-nitriles from which two products have been separated. The high-melting (90–91° C.) isomer, which is believed to be gamma-dimethylamino-alpha,alpha-diphenylvaleronitrile, is ordinarily isolated from the mixture and used in the preparation of amidone; but the low-melting (67–68° C.) isomer, believed to be gamma-dimethylamino-alpha,alpha-diphenyl-beta-methylbutyronitrile, has been a useless by-product. However, in accordance with the present invention, this hitherto useless by-product has become an important intermediate in the preparation of the analgesic composition referred to above.

It is noteworthy that when the mixture of isomeric dimethylaminoalkyl-diphenylacetonitriles is treated at comparatively moderate temperatures (below 65° C.) with ethylmagnesium halide, and the resultant condensation product is hydrolyzed, the end-product of the reaction is amidone, and the lower melting isomeric nitrile does not appear to be acted upon appreciably by the Grignard reagent. Moreover, if the lower-melting isomeric nitrile alone is subjected to the action of ethylmagnesium halide under reaction conditions which are most favorable for the reaction of the Grignard reagent with the higher-melting isomer, any amount of reaction product formed is insignificant. We have discovered that if the low melting nitrile isomer is treated with an ethyl Grignard reagent at a temperature of about 70° C. or above, and preferably at about 90° C., a reaction can be made to take place between the nitrile and the Grignard reagent. The reaction product can then be hydrolyzed under conditions of elevated temperature with aqueous acid to give a product which is the amidone isomer of this invention.

Other isomers of amidone, made by other processes, are known; but these do not appear to have both the high analgesic activity and low toxicity of the isomer of my invention. The molecular structure of these isomers, of which many are theoretically possible, is not known with certainty and the suggested structures are based on dubious inferences from the method of synthesis, or speculation. I prefer, therefore, to define my analgesic product by its properties and those of such a convincing number of derivatives that there can be no question that it has been indentified as unique and distinguished from other chemical compounds.

The following specific examples illustrate the preparation of the analgesic compound and its salts.

*Example 1*

The Grignard reagent was prepared in a 1 liter flask from 16.8 g. of magnesium turnings suspended in 80 ml. of anhydrous ether by adding dropwise 77 g. of ethyl bromide dissolved in 80 ml. of ether. After the addition of the bromide had been completed, the mixture was refluxed for one-half hour to insure complete reaction. A solution of 100 g. of gamma-dimethylamino-alpha, alpha-diphenyl-beta-methylbutyronitrile (melting point 67–68° C.) in 160 ml. of dry xylene was added over a period of five minutes. The flask was arranged for distillation and ether was distilled off until the temperature within the flask reached 95° C. The reaction mixture was then maintained at a temperature between 90–95° C. for 3½ hours, after which it was cooled in an ice bath and 60 g. of ammonium chloride in 200 ml. of water were slowly added. When the decomposition was complete 100 ml. of 20% hydrochloric acid was added slowly followed by 150 ml. of conc. hydrochloric acid. This mixture was then distilled until the distillate came over clear indicating that all the xylene had been removed. On standing overnight, crystals of the hydrobromide salt were deposited. They were collected and amounted to 120 g. when dry. This product was recrystallized from 450 ml. of water containing 20 g. of ammonium bromide and then from 250 ml. of water containing 10 g. of ammonium bromide. A yield of 60 g. of crude hydrobromide with a melting point of 139–145° C. was obtained.

The crude hydrobromide was dissolved in water and the free base precipitated by the addition of ammonia until the solution was basic to phenolphthalein. A viscous oil separated. This oil was washed by decantation until free of halogen. It was finally distilled under reduced pressure. The fraction boiling at 173–178° C. at 1½ mm. pressure was collected, $n_D^{26}$ 1.5565–1.5575, $d^{25}$ 1.03.

This base formed a picrate which, when crystallized from ethyl alcohol, had a melting point of 152–153° C. (uncor.). It also formed a methiodide which melted after recrystallization from a mixture of ethyl alcohol and ethyl acetate at 265–266° C. (uncor.). It formed an oxalate which melted at 167.5–168.5° C. (uncor.) after recrystallization from isopropyl alcohol.

*Example 2*

The distilled base from 60 g. of the hydrobromide salt of Example 1 was dissolved in 150 ml. of water containing 30 ml. of concentrated hydrochloric acid and 20 g. of ammonium chloride. On cooling, crystals of the hydrochloride salt were obtained. These were recrystallized from 400 ml. of acetone. The product was air-dried overnight and then dried for twelve hours at 105° C. A yield of 40 g. of material melting at 196–198° C. was obtained. Analysis of this hydrochloride was in agreement with the empirical formula $C_{21}H_{28}ClNO$.

|    | Percent Calculated | Percent Found |
|----|---|---|
| C  | 72.91 | 72.60 |
| H  | 8.16 | 7.94 |
| Cl | 10.25 | 10.24 |
| N  | 4.05 | 3.93 |

*Example 3*

Thirteen grams of the base of Example 1 were dissolved in 50 ml. of hot water containing 9 grams of 40% hydrobromic acid and 5 g. of ammonium bromide. On cooling, crystals of the hydrobromide salt were obtained. These were recrystallized from 25 ml. of methyl alcohol and 200 ml. of anhydrous ether. A yield of 14 g. was obtained which had a melting point of 155–157° C. (uncor.).

*Example 4*

Twelve grams of the base compound and 6 g. of tartaric acid were dissolved in 25 ml. of boiling acetone. On cooling, crystals of the acid tartrate were obtained. On recrystallization from 50 ml. of isopropyl alcohol, 12 g. of product were obtained which had a melting point of 157–159° C. (uncor.).

Salts of the base compound, such as the hydrochloride or hydrobromide, are moderately soluble in water. The hydrochloride is soluble to the extent of approximately 10% at room temperature, while the hydrobromide is only slightly less soluble. The base compound itself is substantially insoluble in water, but readily soluble in organic solvents, so that where an aqueous analgesic composition is to be prepared a hydrochloride or hydrobromide salt is preferably used. In addition, the hydrochloride is soluble in alcohol and accordingly may be utilized in alcoholic analgesic compositions.

Other salts than the hydrobromide and hydrochloride may be similarly employed. Other salts with mineral as well as organic acids may be prepared and some of these may have particularly desirable properties for special purposes.

The base compound and its salts described above possess valuable analgesic activity. In general, it is preferred that they be utilized in the preparation of analgesic compositions, in which event it will be found that these compositions have a therapeutic effect comparable to similar compositions in which amidone is used. Pharmacological studies indicate that the base compound and its salts are equally as effective as amidone and twice as effective as morphine as an analgesic, while the toxicity is about half that of amidone.

The amidone isomer of the present invention may be used in hypodermic tablets or solutions, pills, elixirs, or syrups or in other well-known methods for administration.

The diemthylaminopropyl-diphenylacetonitrile (M. P. 67–68° C.), which is formed with gamma-dimethylamino-alpha, alpha-diphenylvaleronitrile by the reaction of diphenylacetonitrile with dimethylaminochloropropane, may be separated from the mixture by fractional crystallization. The mixture is dissolved in alcohol and on cooling the valeronitrile crystallizes out. The alcohol is removed from the mother liquors and the residue is recrystallized from petroleum ether until a product of melting point of 67–68° C. is obtained. I have also found that these isomers may be separated by fractional crystallization of their salts, for example, the acid sulfate or the oxalate.

Attention is directed to my copending application, Serial No. 241,160, filed August 9, 1951.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

I claim:

1. The method of forming the isomer of amidone $n_D^{26}$ 1.5565–1.5575 and $d^{25}$ 1.03 whose hydrochloride has the approximate melting point 196–8° C. which comprises mixing together a dimethylaminopropyl-diphenylacetonitrile (M. P. 67–8° C.) and an ethyl Grignard reagent, heating the mixture to a temperature of at least approximately 70° C. and then hydrolyzing the product.

2. The method of forming the isomer of amidone of $n_D^{26}$ 1.5565–1.5575 and $d_{25}$ 1.03 whose hydrochloride has the approximate melting point 196–8° C. which comprises mixing together a dimethylaminopropyl-diphenylacetonitrile (M. P. 67–8° C.) and an ethyl Grignard reagent, heating the mixture to a temperature of at least approximately 90° C. and then hydrolyzing the product.

3. The method of forming the isomer of amidone of $n_D^{26}$ 1.5565–1.5575 and $d^{25}$ 1.03 whose hydrochloride has the approximate melting point 196–8° C. which comprises mixing together a dimethylaminopropyl-diphenylacetonitrile (M. P. 67–8° C.) and ethyl magnesium bromide, heating the mixture to a temperature of approximately 90° C. and then hydrolyzing the product.

ROGER W. STOUGHTON.

References Cited in the file of this patent

UNITED STATES PATENTS

| Number | Name | Date |
| --- | --- | --- |
| 2,387,447 | Hoffmann et al. | Oct. 23, 1945 |

FOREIGN PATENTS

| Number | Country | Date |
| --- | --- | --- |
| 61,463 | Denmark | June 18, 1942 |

OTHER REFERENCES

Kleiderer et al.: "P. B. 981" (Office of the Publication Board, Dept. Commerce, Wash., D. C. July 1945) pp. 96, 96A–97.

Scott et al.: "J. Pharm. Expt. Ther.," vol. 87, May 1946, p. 63.

Scott et al.: "Science," vol. 104, pp. 587–588 (December 1946).

Schultz et al.: "J. Am. Chem. Soc.," vol. 69, pp. 188–189 (January 1947).

Blicke et al.: "Abstracts, A. C. S. Meetings," (Atlantic City, April 1947), pp. 3 K, 4K.

Easton et al.: "J. Am. Chem. Soc.," vol. 69, pp. 976–977 (April 1947).

Scott et al.: Chemical Abstracts, vol. 40, 5143 (September 10, 1946).

Garner et al.: Chemical Abstracts, vol. 40, 4048, July 20, 1946.

Whitmore: Organic Chemistry, 1937, page 502.

Easton et al.: JACS, vol. 70, January 1948, pp. 76–78.

Bios Final Report No. 1404 (PB 86142), pp. 141–3, (U. S. publication date February 27, 1948 (S–771); in Britain, Rept. listed in Tech. Index of Reports on German Industry. Published up to and including September 27, 1941, by British Intelligence Objectives Sub-Committee).